United States Patent Office 3,732,192
Patented May 8, 1973

3,732,192
RUBBER FORMULATIONS CONTAINING
THIOSULFONATE ESTERS
Robert J. Arnold, Chicago, Ill., assignor to Universal Oil
Products Company, Des Plaines, Ill.
No Drawing. Filed May 24, 1971, Ser. No. 146,482
Int. Cl. C08f 27/06
U.S. Cl. 260—79.5 B                                    10 Claims

ABSTRACT OF THE DISCLOSURE

Controlling prevulcanization of a vulcanizable diene rubber formulation containing antiozonant and vulcanization accelerator by incorporating therein a thiolsulfonate of a particular composition having the formula

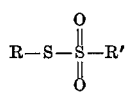

where R and R' are aryl, alkyl, cycloalkyl or substituted derivatives thereof.

BACKGROUND OF THE INVENTION

Various changes in the processing of rubber formulations have been adopted to facilitate processing and to improve the properties of the rubber products. Some of these changes have adversely affected the premature vulcanization or scorching. One such change is the use of an antiozonant in the rubber formulation in order to impart protection to the rubber product against ozone cracking. The more popular antiozonants are of the phenylenediamine type and these antiozonants appear to promote scorching. Another change has been the use of high pH furnace black which appears to lack the inherent inhibiting effect of the acidic channel blacks. Another has been the use of thiazolesulfenamide accelerators which delay the vulcanizing process but, once started, results in rapid curing. A number of retarders have been proposed in the prior art but some of these suffer from the disadvantage of either being of limited effectiveness with thiazolesulfenamide accelerators and/or adversely affecting the vulcanizing process. Accordingly, there is a need for an improved method of controlling the scorching properties of the rubber formulations in order to meet the requirements of the particular processing procedure used in the manufacture of the rubber products.

DESCRIPTION OF THE INVENTION

It now has been found that certain thiolsulfonates serve to effectively control the scorching properties of rubber formulations containing an antiozonant and a vulcanizing accelerator. In most cases, the thiolsulfonate serves to delay prevulcanization and thereby provides sufficient time for the satisfactory processing of the rubber formulation. In other cases, it may be desired to accelerate the vulcanization and, as another advantage to the present invention, certain thiolsulfonates function in this manner.

In one embodiment, the present invention relates to the method of controlling prevulcanization of a vulcanizable diene rubber formulation containing antiozonant and vulcanizing accelerator, which comprises incorporating therein a thiolsulfonate of the formula

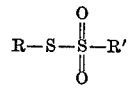

where R and R' are organic radicals.

In another embodiment, the present invention relates to vulcanizable diene rubber formulation containing antiozonant, vulcanizing accelerator and thiolsulfonate of the formula hereinbefore set forth.

In a preferred embodiment, R and R' in the above formula are independently selected from aryl, alkyl, cycloalkyl and substituted derivatives thereof.

Where R and/or R' in the above formula is aryl, it preferably comprises phenyl and substituted derivatives thereof. In a preferred embodiment the substituent is selected from alkyl of 1 to 20 and preferably 1 to 6 carbon atoms in either straight or branched chain arrangement and of primary, secondary or tertiary alkyl configuration. In another preferred embodiment the substituent comprises $NO_2$. Other substituents comprise halogen including chlorine, bromine, iodine and fluorine, with chlorine and bromine being preferred, SR'', SH, OH and OR'' where R'' is alkyl of 1 to 6 carbon atoms. The substitution may be in the o, m, or p position on the phenyl ring and, when two substitutions are attached to a phenyl ring, these may be in the 2,3-, 2,4-, 2,5-, 2,6-, 3,4- or 3,5- positions. Another embodiment comprises the corresponding naphthyl derivatives. As hereinbefore set forth, the differently substituted compounds behave differently and this will be illustrated in the following examples.

Where R and/or R' in the above formula comprises alkyl, the alkyl preferably contains from 1 to 20 and more particularly from 1 to 12 carbon atoms and may be straight or branched chain and of primary, secondary or tertiary configuration. Where R and/or R' in the above formula is cycloalkyl, it preferably contains from 3 to about 12 carbon atoms in the ring, with cyclohexyl being especially preferred. The cycloalkyl ring may contain one or more substituents selected from those hereinbefore set forth.

In a particularly preferred embodiment, at least one of R and/or R' is aryl and more particularly phenyl. Illustrative compounds in this embodiment include ethyl benzenethiolsulfonate,
propyl benzenethiolsulfonate,
butyl benzenethiolsulfonate,
pentyl benzenethiolsulfonate,
hexyl benzenethiolsulfonate,
heptyl benzenethiolsulfonate,
octyl benzenethiolsulfonate,
nonyl benzenethiolsulfonate,
decyl benzenethiolsulfonate,
undecyl benzenethiolsulfonate,
dodecyl benzenethiolsulfonate, etc.;
ethyl toluenethiolsulfonate,
propyl toluenethiolsulfonate,
butyl toluenethiolsulfonate,
pentyl toluenethiolsulfonate,
hexyl toluenethiolsulfonate,
heptyl toluenethiolsulfonate,
octyl toluenethiolsulfonate,
nonyl toluenethiolsulfonate,
decyl toluenethiolsulfonate,
undecyl toluenethiolsulfonate,
dodecyl toluenethiolsulfonate, etc.;
ethyl nitrobenzenethiolsulfonate,
propyl nitrobenzenethiolsulfonate,
butyl nitrobenzenethiolsulfonate,
pentyl nitrobenzenethiolsulfonate,
hexyl nitrobenzenethiolsulfonate,
heptyl nitrobenzenethiolsulfonate,
octyl nitrobenzenethiolsulfonate,
nonyl nitrobenzenethiolsulfonate,
decyl nitrobenzenethiolsulfonate,
undecyl nitrobenzenethiolsulfonate,
dodecyl nitrobenzenethiolsulfonate, etc.

It is understood that the toluene moiety may be replaced with ethylphenyl, propylphenyl, butylphenyl, pentylphenyl, hexylphenyl, etc., and also that the alkyl substituent preferably is in the para position, although it may be in the meta or ortho position on the phenyl ring. The nitro substituent preferably is in the meta position, although it may be in the para or ortho position. The above specific compounds are for illustrative purposes only and not intended as limiting.

Where R and R' are phenyl, illustrative compounds include phenyl benzenethiolsulfonate, tolyl benzene thiolsulfonate, ethylphenyl benzenethiolsulfonate, propylphenyl benzenethiolsulfonate, butylphenyl benzenethiolsulfonate, pentylphenyl benzenethiolsulfonate, hexylphenyl benzenethiolsulfonate, etc., dimethylphenyl benzenethiolsulfonate, methylethylphenyl benzenethiolsulfonate, diethylphenyl benzenethiolsulfonate, dipropylphenyl benzenethiolsulfonate, methylpropylphenyl benzenethiolsulfonate, ethylpropylphenyl benzenethiolsulfonate, dibutylphenyl benzenethiolsulfonate, methylbutylphenyl benzenethiolsulfonate, ethylbutylphenyl benzenethiolsulfonate, propylbutylphenyl benzenethiolsulfonate, etc., phenyl toluenethiolsulfonate, tolyl toluenethiolsulfonate, ethylphenyl toluenethiolsulfonate, propylphenyl toluenethiolsulfonate, butylphenyl toluenethiolsulfonate, pentylphenyl toluenethiolsulfonate, hexylphenyl toluenethiolsulfonate, etc., dimethylphenyl toluenethiolsulfonate, methylethylphenyl toluenethiolsulfonate, diethylphenyl toluenethiolsulfonate, dipropylphenyl toluenethiolsulfonate, methylpropylphenyl toluenethiolsulfonate, ethylpropylphenyl toluenethiolsulfonate, dibutylphenyl toluenethiolsulfonate, methylbutylphenyl toluenethiolsulfonate, ethylbutylphenyl toluenethiolsulfonate, propylbutylphenyl toluenethiolsulfonate, etc., nitrophenyl benzenethiolsulfonate, nitrophenyl toluenethiolsulfonate, nitrophenyl nitrobenzenethiolsulfonate, nitrophenyl nitrotoluenethiolsulfonate, etc. Here again, it is understood that the alkyl and/or nitro substituents may be in the ortho, meta or para positions and that the specific compounds are for illustrative purposes only and not intended as limiting.

When R or R' in the above formula is cycloalkyl, preferred illustrative compounds are cyclohexyl benzenethiolsulfonate, cyclohexyl toluenethiolsulfonate, cyclohexyl nitrobenzenethiolsulfonate, cyclohexyl nitrotoluenethiolsulfonate, etc. Other compounds comprise those in which the cyclohexyl moiety is replaced by cyclopropyl, cyclobutyl, cyclopentyl, cycloheptyl, cyclooctyl, etc., with the understanding that the cycloalkyl ring may contain substituents selected from those hereinbefore set forth.

In still another embodiment, R and/or R' in the above formula is a phenylalkyl moiety. Illustrative examples in this embodiment include benzyl benzenethiolsulfonate, phenylethyl benzenethiolsulfonate, phenylpropyl benzenethiolsulfonate, phenylbutyl benzenethiolsulfonate, benzyl alphatoluenethiolsulfonate, phenylethyl alphatoluenethiolsulfonate, phenylpropyl alphatoluenethiolsulfonate, phenylbutyl alphatoluenethiolsulfonate, benzyl p-toluenethiolsulfonate, phenylethyl p-toluenethiolsulfonate, phenylpropyl p-toluenethiolsulfonate, phenylbutyl p-toluenethiolsulfonate, etc.

In another embodiment, illustrative compounds include alkyl alkanethiosulfonates as, for example, propyl propanethiolsulfonate, propyl butanethiolsulfonate, propyl pentanethiolsulfonate, propyl hexanethiolsulfonate, propyl octanethiolsulfonate; butyl propanethiolsulfonate, butyl butanethiolsulfonate, butyl pentanethiolsulfonate, butyl hexanethiolsulfonate, butyl octanethiolsulfonate; methyl octanethiolsulfonate, ethyl octanethiolsulfonate, propyl octanethiolsulfonate, butyl octanethiolsulfonate, methyl decanethiolsulfonate, etc.

In a preferred embodiment, at least one of R and R' in the above formula is phenyl. Illustrative compounds in this embodiment include phenyl propanethiolsulfonate, phenyl butanethiolsulfonate, phenyl pentanethiolsulfonate, phenyl hexanethiolsulfonate, phenyl heptanethiolsulfonate, phenyl octanethiolsulfonate, phenyl nonanethiolsulfonate, phenyl decanethiolsulfonate, etc., and corresponding compounds in which the phenyl radical is substituted with one or more groups selected from those hereinbefore set forth. Other illustrative compounds include phenyl cyclohexanethiolsulfonate and corresponding compounds in which the phenyl ring contains one or more substitutions selected from those hereinbefore set forth; cyclohexyl cyclohexanethiolsulfonate and corresponding compounds in which one or both of the cyclohexyl groups is replaced by a cycloalkyl group containing from 3, 4, 5, 7, 8 or more carbon atoms in the ring.

The thiolsulfonates are used in any suitable concentration and generally will be within the range of from about 1 to about 2 parts by weight per 100 parts of rubber hydrocarbon in the formulation. They are prepared in any suitable manner. General methods of preparation are disclosed in the prior art. For example, the preparation by direct peracid oxidation of a disulfide is described by Leandri, G., and Tundo, A., Ann., Chim. (Rome), 44, 63–73 (1954). The preparation by the addition of a sulfenyl chloride to a sodium salt of a sulfinic acid is described by Kice, J. L., and Engebrecht, R. H., J. Org. Chem., 27, 4654 (1962). The preparation by chlorinolysis of a disulfide in the presence of acetic acid, followed by the addition of $H_2O$ is described by Douglass, I. B., and Farah, B.S., J Org. Chem., 24, 973 (1959).

Applicant has developed an improvement in the preparation of the alkyl arene thiolsulfonates, aryl alkane thiolsulfonates or aryl arene thiolsulfonates in high yields. The improved method consists in the drop-wise addition of a previously prepared solution of a sulfenyl chloride in a suitable organic solvent to a cooled (0 to 10° C.) well stirred slurry of the sodium salt of an appropriate sulfinic acid in the same or different organis solvent. Moisture should be excluded because the presence of moisture results in poorer yields.

It is understood that any suitable method of preparation may be used. The examples of the present application illustrate specific preparations.

As hereinbefore set forth, the thiolsulfonate is used in a rubber formulation containing an antiozonant and a vulcanizing accelerator. Any suitable vulcanizing accelerator may be used and conveniently comprises a conventional accelerator. Illustrative aromatic thiazole accelerators include 2-mercaptobenzothiazole, N-cyclohexyl-2-benzothiazole sulfenamide, N-tert-butyl-2-benzothiazole sulfenamide, 2-(morpholinothio)-benzothiazole, 2-benzothiazolyl diethyldithiocarbamide, etc., amine salts of mercaptobenzothiazole accelerators, etc. Other accelerators include tetramethylthiuram, thiocarbamylsulfenamides, thioureas, xanthates, guanidine derivatives, etc. The vulcanizing accelerator will be used in conventional concentrations in the rubber formulation and generally will be within the range of from about 1 to about 1.5 parts by weight per 100 parts of rubber hydrocarbon in the formulation. It is understood that smaller or larger concentrations may be used when desired.

Another ingredient in the rubber formulation is an antiozonant. As hereinbefore set forth, the antiozonant decreases the scorch time. Any suitable antiozonant is used in the rubber formulation and, in one embodiment, is of the phenylenediamine type and includes, for example, N,N'-di-sec-alkyl-p-phenylenediamine in which the alkyl contains from 3 to 12 carbon atoms, N-phenyl-N'-cyclohexyl-p-phenylenediamine, etc. In another embodiment the antiozonant is of the aminophenol type and includes $N-C_3-C_{20}$-alkyl-p-aminophenol, N-cycloalkyl-p-aminophenol in which the cycloalkyl ring contains from 3 to 12 carbon atoms, etc. The antiozonant may be used in a concentration of from 1 to about 5 parts by weight per 100 parts of rubber hydrocarbon in the formulation.

It is understood that the particular thiolsulfonate, antiozonant and vulcanization accelerator will be selected to satisfy the specific requirements of the particular processing method employed in the manufacturing plant. The rubber formulation also generally will include carbon, zinc oxide, sulfur, stearic acid, antioxidant, etc., all of these being used in conventional concentrations. The vulcanization is effected in conventional manner.

The following examples are introduced to illustrate further the novelty and utility of the present invention but not with the intention of unduly limiting the same.

EXAMPLE I

This example describes the preparation of p-tolyl p-toluenethiolsulfonate. To a cooled solution of p-tolyl disulfide (24.6 g., 0.1 mole) in 150 ml. of methylene chloride ($CH_2Cl_2$) was added with stirring a solution of m-chloroperoxybenzoic acid (34.6 g., 0.20 mole) in ca. 250 ml. of $CH_2Cl_2$. After overnight stirring at room temperature, the m-chlorobenzoic acid was filtered from the solution. The filtrate was washed with two 100 ml. portions of a saturated $NaHCO_3$ solution, dried ($MgSO_4$) and the solvent removed under vacuum to afford 18.6 g. (67.0% yield) of the crude thiolsulfonate. Recrystallization from methanol gave the pure p-tolyl p-toluenethiolsulfonate, M.P. 71.5–73° C. The M.P. reported in the literature is 78.5–79.5° C.

EXAMPLE II

This example describes the preparation of phenyl p-toluenethiolsulfonate. In this preparation, 3.6 g. (0.08 mole) of chlorine was condensed into a large test tube and added as a gas (by spontaneous evaporation on warming) to a cooled (+5 to —10° C. bath temperature) stirred solution of 11.4 g. (0.05 mole) of diphenyl disulfide in 100 ml. of dichloromethane. The resulting sulfenyl chloride was added dropwise to a stirred slurry of 17.8 g. (0.1 mole) of the sodium salt of p-toluene sulfinic acid in ca. 200 ml. of $CH_2Cl_2$ and stirred overnight at room temperature. The NaCl was then filtered from the solution and the filtrate washed with water and a saturated $NaHCO_3$ solution, dried, and the solvent removed to give an orange oil which crystallized on standing. Recrystallization from methanol afforded the thiolsulfonate (16.0 g., 60.6% yield) as white needles, M.P. 60–63° C.

EXAMPLE III

This example describes the preparation of m-nitrophenyl m-nitrobenzenethiolsulfonate. In this preparation, 14.2 g. (0.2 mole) of chlorine was added to a cooled solution (—5 to —10° C. bath temperature) of 30.8 g. (0.1 mole) of m-nitrodiphenyl disulfide and 6.0 g. (0.1 mole) of acetic acid in ca. 75 ml. of $CH_2Cl_2$ in the same manner as described above. To this cooled (5–10° C.) mixture of sulfinyl chloride, sulfenyl chloride and acetyl chloride was added dropwise with stirring 3.6 g. of water. After evolution of HCl the solution was warmed to room temperature and stirred for an additional hour. This solution was further diluted with an additional amount of $CH_2Cl_2$ and washed with water and a saturated $NaHCO_3$ solution, dried, and the solvent removed to afford 32 g. (94% yield) of the crude thiolsulfonate. Recrystallization from benzene gave tan crystals, M.P. 119–121° C.

EXAMPLE IV

This example describes the preparation of p-tolyl m-nitrobenzenethiolsulfonate. In this preparation, 10.7 g. (0.15 mole) of chlorine was added in the same manner as described above to a stirred cold (—5 to —10° C. bath temperature) solution of 15.4 g. (0.05 mole) of m-nitrophenyl disulfide and 6.0 g. (0.1 mole) of glacial acetic acid in 75 ml. of $CH_2Cl_2$. To this mixture of sulfinyl chloride and acetyl chloride was added 12.3 g. (0.05 mole) of p-tolyl disulfide and an additional 3.6 g. (0.05 mole) of chlorine. The mixture was stirred at —5 to —10° C. for 10 minutes and 3.6 g. (0.2 mole) of water was added dropwise while maintaining the temperature below 10° C.; vigorous evolution of HCl ensued. The resulting mixture was stirred for an additional 30–60 minutes and washed with water and a $NaHCO_3$ solution, dried and the solvent removed to give 26.0 g. (84.1% yield) of the crude thiolsulfonate. Recrystallization from MeOH/benzene (10:1) afforded the pure thiolsulfonate as fine white needles, M.P. 107–108.5° C.

EXAMPLE V

A number of additional thiolsulfonates were prepared. These include the following:

phenyl benzenethiolsulfonate
tolyl benzenethiolsulfonate
phenyl o-nitrobenzenethiolsulfonate
2,4-dinitrophenyl p-toluenethiolsulfonate
cyclohexyl benzenethiolsulfonate
n-octyl benzenethiolsulfonate
benzyl alphatoluenethiolsulfonate The above are illustrative compounds which may be prepared and used in the present invention. These illustrative compounds serve as a basis for the preparation of the other thiolsulfonates by suitable selection of the reactants to be used in preparing the thiolsulfonates.

EXAMPLE VI

This example demonstrates the effectiveness of certain thiolsulfonates to retard scorching of rubber formulations. The rubber formulations of this example were of the following recipe:

TABLE 1

| Ingredient: | Parts by weight |
|---|---|
| SBR 1502 | 100.00 |
| Furnace black | 40.00 |
| Zinc oxide | 3.00 |
| Stearic acid | 2.00 |
| Sulfur | 2.00 |
| TBBS* | 1.25 |
| Antiozonant** | 2.00 |
| Thiolsulfonate | 1.25 |

*N-tert-butyl-benzothiazole-2-sulfenamide.
**N,N'-di-2-octyl-p-phenylenediamine.

Different thiazole compounds were incorporated in different samples of the rubber. The ingredients were incorporated by conventional milling procedure and the formulation was cured for 40 minutes at 140° C.

The scorch values were determined with a large rotor Mooney viscometer at 250° F. (ASTM D–1077–55T). The values represent the number of minutes for a rubber containing a curing agent to increase in viscosity by 5 and then by 20 points. This method simulates conditions encountered during milling and subsequent vulcanization. A high scorch value indicates a high resistance to scorching.

The results of a number of runs are reported in the following table:

TABLE 2

| Run No. | Thiolsulfonate | Mooney scorch 5 pt. | Mooney scorch 20 pt. | Percent increase in 5 pt. rise as compared to blank |
|---|---|---|---|---|
| 1 | None | 19.4 | 21.4 | |
| 2 | p-Tolyl p-toluenethiolsulfonate | 23.9 | 27.5 | 23.2 |
| 3 | Phenyl benzenethiolsulfonate | 23.2 | 26.5 | 19.6 |
| 4 | Phenyl p-toluenethiolsulfonate | 22.6 | 26.2 | 16.5 |

From the data in the above table it will be seen that these thiolsulfonates served to retard scorching of the rubber formulations.

EXAMPLE VII

Another series of evaluations was made in the same manner as described in Example VI. These results are reported in the following table:

TABLE 3

| Run No. | Thiolsulfonate | Mooney scorch 5 pt. | Mooney scorch 20 pt. | Percent increase in 5 pt. rise as compared to blank |
|---|---|---|---|---|
| 5 | None | 21.2 | 23.1 | |
| 6 | p-Tolyl benzenethiolsulfonate | 24.7 | 28.6 | 16.5 |
| 7 | n-Octyl benzenethiolsulfonate | 26.7 | 30.8 | 25.9 |
| 8 | Cyclohexyl benzenethiolsulfonate | 26.0 | 31.2 | 22.6 |
| 9 | Phenyl o-nitrobenzenethiolsulfonate | 27.5 | 30.4 | 29.7 |
| 10 | p-Tolyl m-nitrobenzenethiolsulfonate | 29.0 | 32.1 | 36.8 |

Here again it will be noted that these thiolsulfonates serve to retard scorching of the rubber formulations.

EXAMPLE VIII

As hereinbefore set forth, certain of the thiolsulfonates serve to accelerate scorching and would be used in instances where a shorter time is desired. These are illustrated in the following table:

TABLE 4

| Run No. | Thiolsulfonate | Mooney scorch 5 pt. | Mooney scorch 20 pt. | Percent increase in 5 pt. rise as compared to blank |
|---|---|---|---|---|
| 1 | None | 19.4 | 21.4 | |
| 11 | 2,4-dinitrophenyl p-toluenethiosulfonate | 11.5 | 13.3 | 40.7 |
| 12 | Benzyl alphatoluenethiolsulfonate | 14.4 | 17.7 | 25.8 |

EXAMPLE IX

Natural rubber is compounded in conventional manner to contain 3 phr. of N-phenyl-N'-(1,3'-dimethylbutyl)-p-phenylenediamine antiozonant, one phr. of N-cyclohexyl-2-benzothiazolesulfenamide accelerator and 1.25 phr. of n-octyl benzenethiolsulfonate. The rubber formulation has a high Mooney scorch value and the rubber product is protected against ozone cracking.

EXAMPLE X

Cyclohexyl benzenethiolsulfonate is incorporated in a concentration of one phr. in a cis-4-polybutadiene formulation containing 3 phr. of N,N'-dimethylbutyl)-p-phenylenediamine antioxonant and one phr. of N-tert-hexyl-benzothiazole-2-sulfenamide accelerator.

EXAMPLE XI

The thiolsulfonate is used in a conventional ethylene-propylene terpolymer formulation. The thiolsulfonate is p-tolyl p-toluenethiolsulfonate and is incorporated in the terpolymer formulation in a concentration of one phr. A concentration of one phr. of N-morpholine mercaptobenzothiazole accelerator and 2.5 phr. of N-phenyl-N'-(1 - methylheptyl)-p-phenylenediamine antiozonant are also incorporated in the formulation.

I claim as my invention:

1. Vulcanizable diene rubber formulation containing antiozonant, vulcanizing accelerator and thiolsulfonate of the formula

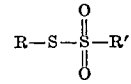

where R and R' are independently selected from the group consisting of aryl, substituted aryl, alkyl of 1 to 20 carbon atoms, cycloalkyl containing 3 to 12 carbon atoms in the ring and substituted cycloalkyl, the substitution being selected from the group consisting of alkyl of 1 to 20 carbon atoms, $NO_2$, halogen, SR'', SH, OH and OR'' where R'' is alkyl of 1 to 6 carbon atoms.

2. The formulation of claim 1 in which at least one of R and R' is aryl.

3. The formulation of claim 2 in which R and R' are phenyl.

4. The formulation of claim 2 in which at least one of R and R' is tolyl.

5. The formulation of claim 2 in which R is nitrophenyl and R' is aryl.

6. The formulation of claim 3 in which R and R' are nitrophenyl.

7. The formulation of claim 1 in which R is aryl and R' is alkyl of 1 to 20 carbon atoms.

8. The method of controlling prevulcanization of a vulcanizable diene rubber formulation containing antiozonant and vulcanizing accelerator which comprises incorporating therein a thiolsulfonate of the formula shown in claim 1.

9. The method of claim 8 containing the thiolsulfonate of claim 2.

10. The method of claim 8 containing the thiolsulfonate of claim 7.

References Cited
UNITED STATES PATENTS 2,851,508    9/1958    Uraneck _____ 260—780

C. A. HENDERSON, JR., Assistant Examiner
JOSEPH L. SCHOFER, Primary Examiner

U.S. Cl. X.R.
260—45.9, 453, 780